(12) United States Patent
Oh et al.

(10) Patent No.: US 9,122,011 B2
(45) Date of Patent: Sep. 1, 2015

(54) DISPLAY DEVICE

(71) Applicant: Samsung Display Co., Ltd., Yongin, Gyeonggi-Do (KR)

(72) Inventors: Joon Hak Oh, Seoul (KR); Ha-Yun Kang, Asan-si (KR); Jong Seo Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/011,955

(22) Filed: Aug. 28, 2013

(65) Prior Publication Data

US 2014/0153213 A1 Jun. 5, 2014

(30) Foreign Application Priority Data

Dec. 5, 2012 (KR) .................. 10-2012-0140476

(51) Int. Cl.
| | |
|---|---|
| *F21V 23/04* | (2006.01) |
| *G02B 5/30* | (2006.01) |
| *G02F 1/1333* | (2006.01) |
| *G06F 3/041* | (2006.01) |
| *G06F 3/043* | (2006.01) |
| *F21V 7/00* | (2006.01) |
| *G02F 1/1335* | (2006.01) |
| *H04R 17/00* | (2006.01) |
| *H04R 5/02* | (2006.01) |

(52) U.S. Cl.
CPC ... *G02B 5/30* (2013.01); *F21V 7/00* (2013.01); *G02F 1/13338* (2013.01); *G06F 3/043* (2013.01); *G06F 3/0412* (2013.01); *G02F 1/133605* (2013.01); *G02F 1/133606* (2013.01); *G02F 2001/133394* (2013.01); *H04R 5/02* (2013.01); *H04R 17/00* (2013.01); *H04R 2499/11* (2013.01); *H04R 2499/15* (2013.01)

(58) Field of Classification Search
CPC .................................. F21V 7/00; G02B 5/30
USPC ........................ 362/19, 97.1, 97.4, 253, 276
See application file for complete search history.

(56) References Cited

U.S. PATENT DOCUMENTS

| | | |
|---|---|---|
| 7,652,724 B2 | 1/2010 | Fukano |
| 7,657,042 B2 | 2/2010 | Miyata |
| 7,826,134 B2 | 11/2010 | Choi |
| 2001/0006006 A1 | 7/2001 | Hill |
| 2007/0019134 A1 | 1/2007 | Park et al. |
| 2007/0071259 A1 | 3/2007 | Tojo |
| 2011/0299006 A1 | 12/2011 | Cheng et al. |

FOREIGN PATENT DOCUMENTS

| | | |
|---|---|---|
| JP | 2001-189978 A | 7/2001 |
| JP | 2006-050264 A | 2/2006 |

(Continued)

OTHER PUBLICATIONS

Extended European Search Report for corresponding European Patent Application No. 13182149.8-1904, dated Mar. 14, 2014, 8 pages.

*Primary Examiner* — Meghan Dunwiddie
(74) *Attorney, Agent, or Firm* — Cantor Colburn LLP

(57) ABSTRACT

A display device includes: a display panel assembly; and a backlight unit. The backlight unit includes an optical sheet, a reflective sheet and a light source. One of the optical sheet and the reflective sheet includes a material which supplies a sound by receiving an electrical field.

24 Claims, 19 Drawing Sheets

(56) References Cited

FOREIGN PATENT DOCUMENTS

| | | |
|---|---|---|
| JP | 2006-268182 A | 10/2006 |
| JP | 2007-052260 A | 3/2007 |
| JP | 2007072018 A | 3/2007 |
| JP | 2007-189604 A | 7/2007 |
| JP | 2008-079179 A | 4/2008 |
| JP | 2008-193486 A | 8/2008 |
| JP | 2010003582 A | 1/2010 |
| JP | 2010-124442 A | 6/2010 |
| JP | 4725469 B2 | 4/2011 |
| JP | 4923490 B2 | 2/2012 |
| KR | 1020070027879 A | 3/2007 |
| KR | 1020080012569 A | 2/2008 |
| WO | 2013109128 A2 | 7/2013 |

DISPLAY DEVICE

This application claims priority to Korean Patent Application No. 10-2012-0140476 filed on Dec. 5, 2012, and all the benefits accruing therefrom under 35 U.S.C. §119, the entire contents of which are incorporated herein by reference.

BACKGROUND (a) Field

The invention relates to a display device, and more particularly, to a display device which displays an image and generates a sound or vibration.

(b) Description of the Related Art

Display devices have been developed from a cathode ray tube ("CRT") type using an existing cathode ray tube to various flat panel display devices such as a liquid crystal display ("LCD"), a plasma display panel ("PDP"), an organic light emitting diode ("OLED") display, an electrowetting display ("EWD"), an electrophoretic display ("EPD"), an embedded micro cavity display ("EMD"), and a nano crystal display ("NCD").

The LCD which has been in the limelight among the flat panel display devices has advantages such as reduced size, reduced weight and low power consumption. With such advantages, the LCD has gradually received attention as a replacement means capable of overcoming a disadvantage of the existing CRT. The LCD is mounted and used on almost all information processing apparatuses requiring a display device.

The LCD includes a LCD panel which generates an electrical field in a liquid crystal material between an upper substrate including a common electrode, a color filter and the like, and a lower substrate including a thin film transistor, a pixel electrode and the like, and applying different electrical potentials to the pixel electrode and the common electrode to change alignment of liquid crystal molecules in the liquid crystal material. As a result, the LCD displays images by controlling transmittance of light through the changes in alignment of the liquid crystal molecules.

In the LCD, since the LCD panel is a non-emissive element which does not emit light itself, the LCD further includes a backlight unit provided below the LCD panel for supplying light to the LCD panel.

Since the OLED display among the flat panel display devices includes a light emitting diode which emits light itself, the OLED display has an advantage in that the backlight unit is not used.

SUMMARY

The invention provides a display device having advantages of generating a sound without installing a separate speaker or detecting a touch without adding a separate touch panel and/or touch sensor.

An exemplary embodiment of the invention provides a display device, including: a display panel assembly; a backlight unit including an optical sheet, a reflective sheet and a light source. One of the optical sheet and the reflective sheet includes a material which supplies a sound by receiving an electrical field.

The material which supplies the sound by receiving the electrical field may include lead zirconium titanate ("PZT"), polyvinylidene fluoride ("PVDF"), polyvinylidene fluoride trifluoroethylene ("PVDF-TrFE") or a combination thereof.

The one of the optical sheet and the reflective sheet may include a vibration material layer including the material which supplies the sound by receiving the electrical field; and a sound element including a pair of electrodes respectively on upper and lower sides of the vibration material layer.

The optical sheet includes the material which supplies the sound by receiving the electrical field, and may further include a diffusion layer on an outer surface of an electrode of the pair of electrodes.

The reflective sheet includes the material which supplies the sound by receiving the electrical field, and may further include a reflective layer on an outer surface of an electrode of the pair of electrodes.

The vibration material layer may include a film form.

The vibration material layer may be in only a partial area of the one of the optical sheet and the reflective sheet.

The one of the optical sheet and the reflective sheet may further include a pair of sound elements.

The display device may further include a spacer between the sound element and a component of the display device. A space in which the sound element vibrates may be defined between the sound element and the component of the display device.

The display device may further include a top chassis, a mold frame, and a bottom chassis which fix the display panel assembly and the backlight in the display device.

The vibration material layer may generate vibration of frequencies outside an audible frequency. A haptic function of the display device may use a change in the frequencies outside the audible frequency to detect a touch.

The display device may further include a window on a display side of the display panel assembly.

The display device may further include a receiver on an inner side of the window and configured to transfer a voice.

The receiver may include a vibration material layer including the material which supplies the sound by receiving the electrical field, and a pair of electrodes.

The vibration material layer may include PZT, PVDF, PVDF-TrFE or a combination thereof.

The window may overlap the receiver.

Another exemplary embodiment of the invention provides a display device, including: a display panel assembly; and a polarization sheet on a display side of the display panel assembly. The polarization sheet includes a vibration material layer including a material which supplies a sound by receiving an electrical field; and a sound element including a pair of electrodes respectively on upper and lower sides of the vibration material layer.

The display panel assembly may be an organic light emitting panel.

The display device may further include a window at display sides of the display panel assembly and the polarization sheet.

The display device may further include a receiver on an inner side of the window and configured to transfer a voice.

The receiver may include the vibration material layer and the pair of electrodes.

The vibration material layer may include PZT, PVDF, PVDF-TrFE or a combination thereof.

The window may overlap the receiver.

The display device may further include an adhesive layer between the polarization sheet and the window.

The display device may further include a cushion layer on a rear side of the display panel assembly.

According to one or more exemplary embodiment of the invention, in a non-emissive display device including a backlight unit, the non-emissive display device provides a sound without a separate speaker through an optical sheet of the backlight unit including a piezo material (for example, a material such as PVDF or PZT) which supplies a sound by receiving an electrical field. Further, in a self-emission display device without the backlight unit, a sound can be provided without a separate speaker through a sound element including a material such as PVDF or PZT which supplies the sound by receiving the electrical field. In addition, when a touch is applied to the display device, the touch can be detected by feed-back thereof within the display device by using vibration generated in frequencies other than an audible frequency, and as a result, a separate touch screen is not required. Furthermore, when the invention is applied to a receiver of a portable phone of a person and a conversation content of another person is provided, although a separate opening for the receiver is not defined in a window at a display side of the display device, the user can hear the conversation content of the other person based on vibration, and as a result, further processing of the window to define the opening therein is unnecessary.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
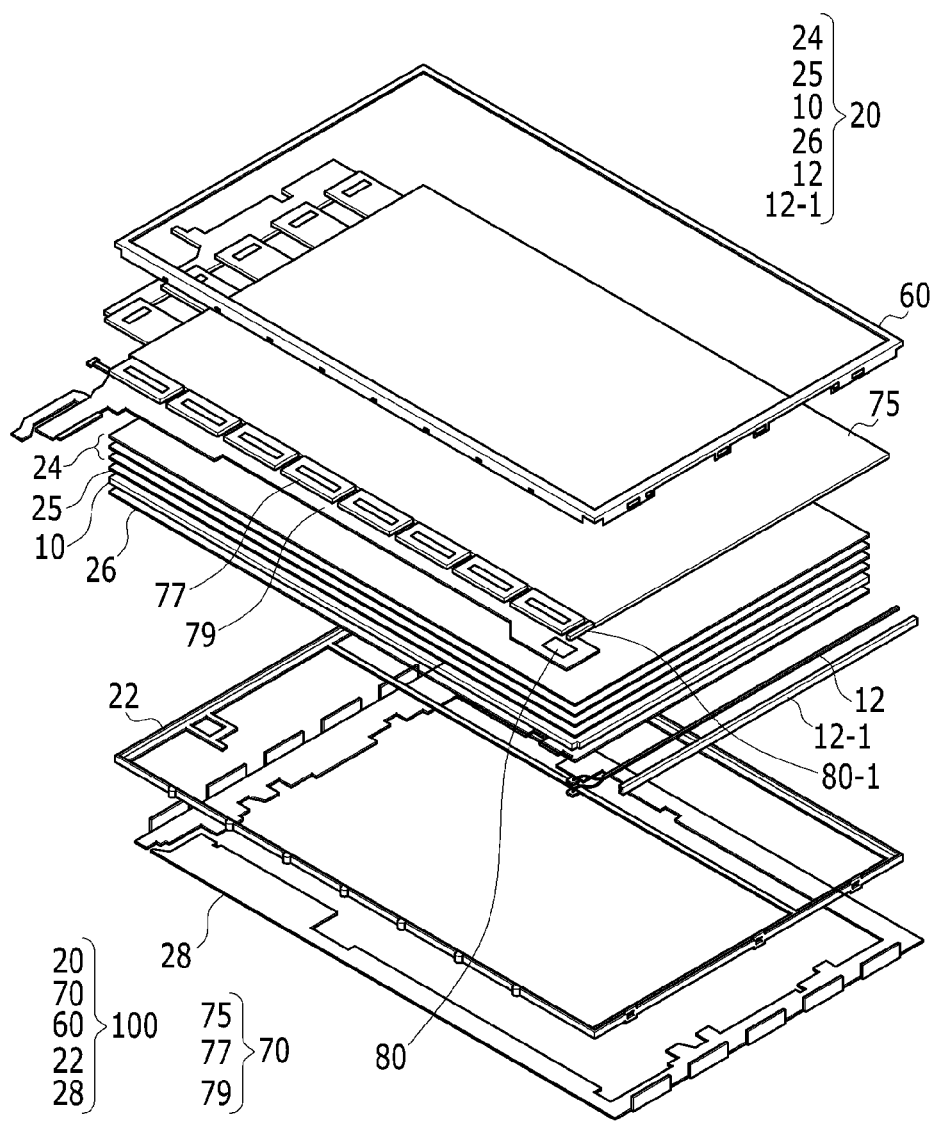
FIG. 1 is an exploded perspective view of an exemplary embodiment of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Flat panel display devices such as a liquid crystal display ("LCD"), a plasma display panel ("PDP"), an organic light emitting diode ("OLED") display, an electrowetting display ("EWD"), an electrophoretic display ("EPD"), an embedded micro cavity display ("EMD"), and a nano crystal display ("NCD") have only a function of displaying images. As a result, a separate speaker needs to be installed in order to supply the generation and/or recognition of sound by the display devices, which undesirably increases costs of the display devices.

Further, in order for the touch sensing display device to sense a touch, such a display device further includes a panel including a touch sensor or a touch sensor incorporated into the display device. Thus additional costs are undesirably incurred.

Hereinafter, an exemplary embodiment of a display device according to the invention will be described in detail with reference to FIGS. 1 and 2.

Figure 2:
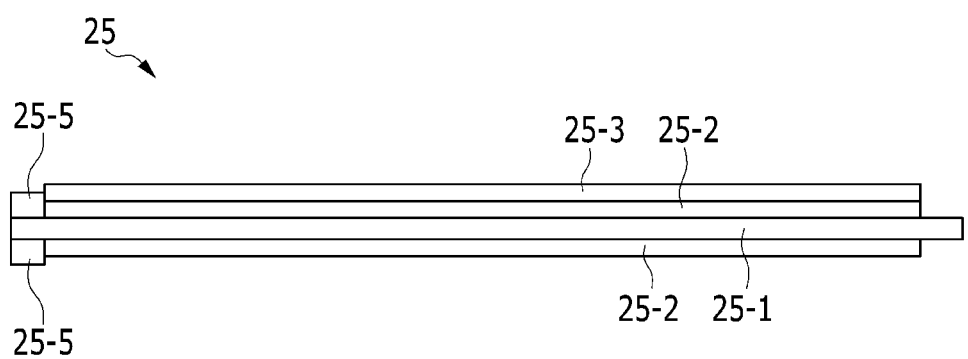
FIG. 2 is a cross-sectional view of an exemplary embodiment of a diffuser sheet according to the invention.

FIG. 1 is an exploded perspective view of an exemplary embodiment of a display device according to the invention, and FIG. 2 is a cross-sectional view of an exemplary embodiment of a diffuser sheet according to the invention.

The display device of FIG. 1 is a non-emissive display device including a light source 12. Hereinafter, a LCD among various non-emissive display devices will be mainly described.

In FIG. 1, a LCD 100 is illustrated.

The LCD 100 will be described.

The LCD 100 as an exemplary embodiment of the display device according to the invention largely includes a backlight unit 20 for supplying light, and a liquid crystal panel assembly 70 receiving the light from the backlight unit 20 to display an image. In addition, the LCD 100 includes a top chassis 60, a mold frame 22, and a bottom chassis 28 for fixing and supporting the backlight unit 20 and the liquid crystal panel assembly 70.

The backlight unit 20 illustrated in FIG. 1 supplies light to the liquid crystal panel assembly 70, and the liquid crystal panel assembly 70 positioned on the backlight unit 20 controls the light supplied by the backlight unit 20 to express gray colors, and as a result, the image is displayed.

First, the liquid crystal panel assembly 70 includes a liquid crystal panel 75, an integrated circuit ("IC") chip 77, and a flexible printed circuit ("FPC") board 79.

The liquid crystal panel 75 includes a lower thin film transistor ("TFT") substrate including a TFT, an upper substrate positioned on the TFT substrate, and a liquid crystal layer injected between the TFT substrate and the upper substrate. The IC chip 77 is mounted on the TFT substrate to control the liquid crystal panel 75.

The TFT substrate includes one or more of the TFT, one or more data line connected to a source terminal of the TFT and one or more gate line connected to a gate terminal of the TFT, on a transparent insulation substrate. The TFT substrate may further include one or more pixel electrode connected to a drain terminal of the TFT. A plurality of TFTs may be arranged in a matrix. The pixel electrode may include transparent indium tin oxide ("ITO") as a conductive material.

The data line and the gate line of the liquid crystal panel 75 are connected to the FPC board 79, and when an electrical signal is input from the FPC board 79, the electrical signal is transferred to the source terminal and the gate terminal of the TFT. The TFT is turned on or off according to a scan signal applied to the gate terminal through the gate line, and thus an image signal applied to the source terminal through the data line is transferred to the drain terminal or interrupted. The FPC board 79 receives the image signal from outside the liquid crystal panel 75 to apply driving signals to the data line and the gate line of the liquid crystal panel 75, respectively.

The upper substrate is disposed on the TFT substrate to face the TFT substrate. The upper substrate is a substrate including one or more color filter such as red, green and blue ("RGB") color filters, and a common electrode including ITO disposed on the color filter. The color filter expresses a predetermined color when light is transmitted therethrough, are may be formed by a thin film process in a method of manufacturing the display device.

When a power supply is applied to the gate terminal and the source terminal of the TFT and then the TFT is turned on, an electrical field is generated between the pixel electrode and the common electrode of the upper substrate. An alignment angle of the liquid crystal injected between the TFT substrate and the upper substrate is changed by the electrical field and light transmittance is changed depending on the changed alignment angle, thereby acquiring a desired image.

The FPC board 79 transmits the image signal and the scan signal which are signals for driving the LCD 100, and a plurality of timing signals for applying the image signal and the scan signal at the appropriate time to apply the image signal and the scan signal to the gate line and the data line of the liquid crystal panel 75, respectively.

In addition, an exemplary embodiment of the FPC board 79 according to the invention, may include thereon an amplifier 80 which amplifies and transfers a sound signal. The amplifier 80 receives a sound signal from the outside, amplifies the sound signal and transfers the amplified sound signal to a diffuser sheet 25 of the backlight unit 20 through a sound signal wire 80-1. In one exemplary embodiment, the sound signal wire 80-1 may include a wire disposed on a flexible substrate including a same material as the FPC board 79, or may include a separate electric wire.

Hereinabove, one structure of the liquid crystal panel 75 as an exemplary embodiment was described. However, unlike the above-described exemplary embodiment, a liquid crystal panel 75 according to various exemplary embodiments may be used. In an alternative exemplary embodiment, for example, the common electrode or the color filter described above as on the upper substrate may be instead disposed on the TFT substrate of the LCD. Further, an additional printed circuit board may be included, and the printed circuit board and the TFT substrate may be connected to each other by the FPC board 79. According to another exemplary embodiment, the amplifier 80 may be disposed on the additional printed circuit board connected to the FPC board 79.

Further, any of a number of non-emissive display panels according to various exemplary embodiments of the invention may be used.

The backlight unit 20 for supplying uniform light to the liquid crystal panel 75 is provided below the liquid crystal panel assembly 70 and is received on the bottom chassis 28.

The backlight unit 20 includes one or more light sources 12 that are fixed to the mold frame 22, and generate and supply light to the liquid crystal panel assembly 70, a substrate 12-1 supplying a power to the light sources 12, a light guide plate 10 guiding light emitted from the light sources 12 to supply the light to the liquid crystal panel assembly 70, a reflective sheet 26 facing an entire lower portion of the light guide plate 10 to reflect light, and the diffuser sheet 25 and an optical sheet 24 securing a luminance characteristic of light from the light sources 12 to supply the ensured luminance characteristic to the liquid crystal panel assembly 70. The optical sheet 24 may include at least one of various optical sheets such as a luminance enhancement film for enhancing luminance or a prism sheet having a prism structure.

In the exemplary embodiment of FIG. 1, a fluorescent lamp such as a cold cathode fluorescent lamp ("CCFL") is used as the light source 12, but according to an alternative exemplary embodiment, a light emitting diode ("LED") may be used. Further, in FIG. 1, the light source 12 is illustrated as an edge type structure in which the light source 12 is positioned on the side of the light guide plate 10, but is not limited thereto. That is, while the illustrated exemplary embodiment shows the light source 12 may be positioned at an edge of the light guide plate 10 as a linear light source, according to an alternative exemplary embodiment, the light source 12 may have a direct type light structure including a surface source of light on the reflective sheet 26.

A top chassis 60 for preventing the liquid crystal panel assembly 70 from deviating from the bottom chassis 28 while bending the FPC board 79 outside the mold frame 22, is provided on the liquid crystal panel assembly 70.

The diffuser sheet 25 according to the exemplary embodiment of FIG. 1 has a characteristic of generating a sound by a piezo material in addition to an original optical characteristic of the diffuser sheet as illustrated in FIG. 2. The piezo material receives an electrical field to supply the sound. The piezo material may include, for example, a vibration material such as polyvinylidene fluoride ("PVDF") or lead zirconium titanate ("PZT"), but is not limited thereto or thereby.

Referring to FIG. 2, an exemplary embodiment of the diffuser sheet 25 according to the invention includes a vibration material layer 25-1, electrodes 25-2, a diffusion layer 25-3 and pads 25-5.

The vibration material layer 25-1 includes a piezo material which vibrates to supply a sound when an electrical field is applied thereto. The piezo material includes PVDF, PZT ceramics (Pb[Zr(x)Ti(1−x)]O$_3$), or the like.

The electrodes 25-2 are respectively disposed on opposing sides (e.g., an upper side and a lower side) of the vibration material layer 25-1. The vibration material layer 25-1 may be considered a base layer of the diffuser sheet 25. The electrodes 25-2 may include a transparent conductor such as ITO and indium zinc oxide ("IZO"), or a conducting polymer and carbon nanotube ("CNT"). The electrodes 25-2 may have a film form, and may be disposed on an entirety of the upper and lower sides of an area (hereinafter, referred to as a display area) of the vibration material layer 25-1 through which light passes through and on which an image is displayed.

A pair of pads 25-5 is disposed in an area (hereinafter, referred to as a non-display area) of the upper and lower sides of the vibration material layer 25-1 through which the light does not pass and on which an image is not displayed. The pair of pads 25-5 is connected with the electrodes 25-2, respectively. The pads 25-5 may include a transparent conductor or an opaque metal. The sound signal amplified by the amplifier 80 is transmitted through the pads 25-5 and applied to the electrodes 25-2 of the diffuser sheet 25 through the sound signal wire 80-1. The vibration material layer 25-1 vibrates by the sound signal, and as a result, the sound is generated by the diffuser sheet 25.

The diffusion layer 25-3 is disposed at an outer side of one or more of the pair of electrodes 25-2. The diffusion layer 25-3 defines a unique optical characteristic of the diffuser sheet 25, that is, the diffusion layer 25-3 serves to diffuse light so that the light supplied from the backlight unit 20 becomes uniform when it passes through the diffuser sheet 25. According to an alternative exemplary embodiment, a pair of diffusion layers 25-3 may be respectively disposed on outer surfaces of the pair of electrodes 25-2.

As such, since the diffuser sheet 25 needs to transfer the light upwards from the backlight unit 20 toward the liquid crystal panel 75, the diffuser sheet 25 is configured to transmit the light by using a transparent material in the display area where the light is transmitted.

In the illustrated exemplary embodiment of FIG. 2, where the diffusion layer 25-3 is positioned on only one side of the diffuser sheet 25 in the backlight unit 20, the diffusion layer 25-3 may be positioned to face the liquid crystal panel assembly 70. However, according to an alternative exemplary embodiment, the diffusion layer 25-3 may be positioned to face the light guide plate 10 of the backlight unit 20.

In FIG. 1, in order to emphasize the diffuser sheet 25, the diffuser sheet 25 is illustrated to be separated from the optical sheet 24, however, the invention is not limited thereto. In an alternative exemplary embodiment, the diffuser sheet 25 may be included in the optical sheet 24, such that the layered structure illustrated in FIG. 2 may be included in any one of the diffuser sheet 25 and the optical sheet 24. The layered structure refers to the vibration material layer 25-1, the electrodes 25-2 and the pads 25-5, with or without the diffusion layer 25-3.

Hereinafter, a sound generation due to the vibration material layer 25-1 will be described with reference to FIGS. 3 and 4.

Figure 3:
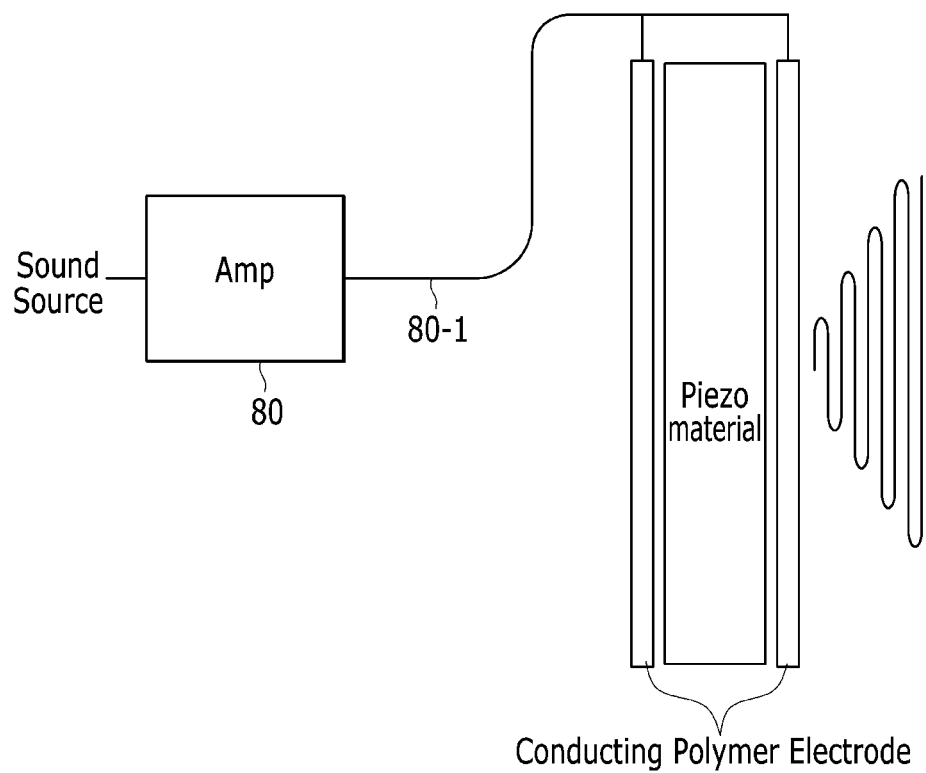
FIGS. 3 and 4 are diagrams for describing an operational characteristic of an exemplary embodiment of a vibration material according to the invention.
Figure 4:
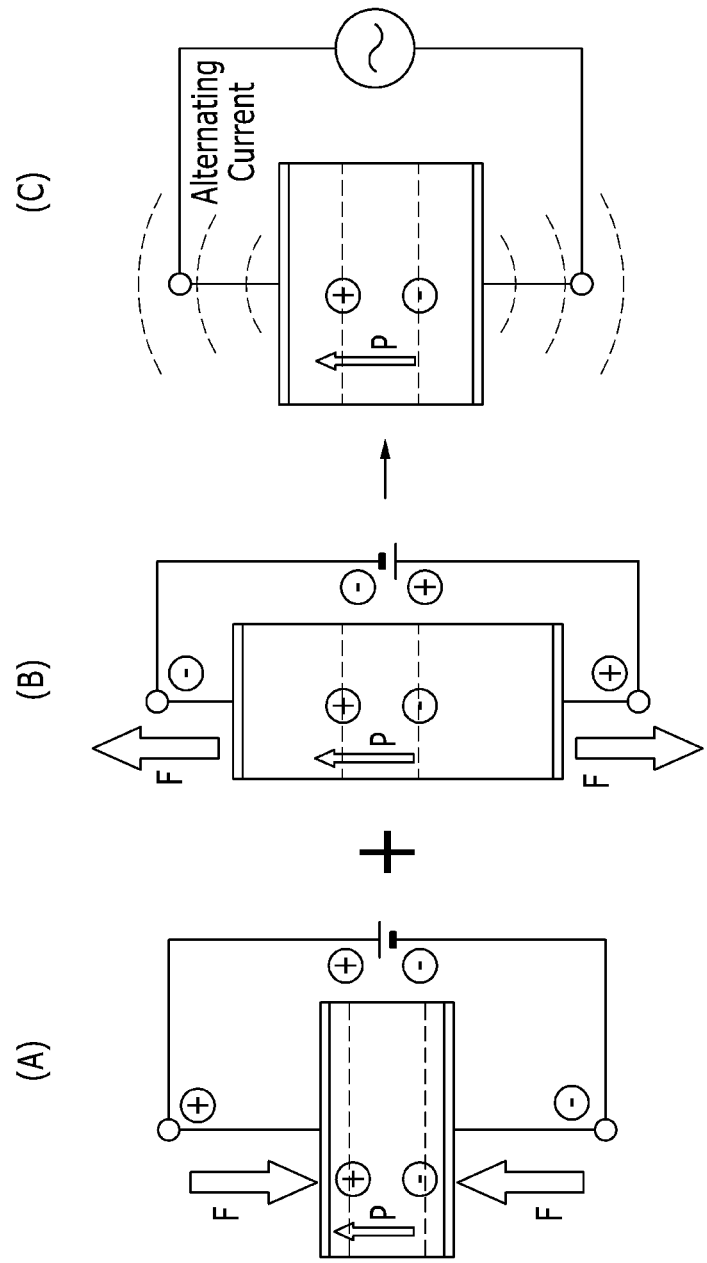

FIGS. 3 and 4 are diagrams for describing an operational characteristic of an exemplary embodiment of a vibration material according to the invention.

In FIG. 3, a piezo material (PVDF or PZT) is used as the vibration material layer, and conducting polymer electrodes are respectively disposed on opposing sides of the vibration material layer. A sound signal from a sound source is amplified in the amplifier (Amp) 80 and transmitted to the polymer electrodes through the sound signal wire 80-1.

As such, when the sound signal is applied to the polymer electrodes, as illustrated in FIG. 4, the vibration material layer vibrates to generate a sound wave.

In FIGS. 4A and 4B, when a unidirectional voltage is applied to the vibration material layer, a characteristic of force F is applied to the vibration material layer as illustrated. Since a direction of the force F varies depending on a direction of the voltage, a thickness of the vibration material layer is changed. That is, in a polarity layout P of the vibration material layer as illustrated in FIG. 4A, when a positive (+) voltage and a negative (−) voltage are applied to electrodes disposed at opposing sides of the vibration material layer, repulsive force F is generated and thus the force F is applied in a direction such that the cross-sectional thickness of the vibration material layer is decreased (refer to the arrows directed towards the layered structure). As illustrated in FIG. 4B, when the positive (+) voltage and the negative (−) voltage are applied to the electrodes reversely, an attractive force F is applied in a direction such that the cross-sectional thickness of the vibration material layer is increased due to the polarity layout P of the vibration material layer (refer to the arrows directed away from the layered structure). An amount of change in the thickness of the vibration material layer is determined according to a force F level, but actually, the change level may be changed at a width which is not recognized by eyes. As illustrated in FIGS. 4A and 4B, when alternating currents are alternately applied (see FIG. 4C), the thickness of the vibration material layer is repeatedly increased or decreased to make the vibration material layer vibrate, and thus, the sound (refer to the serpentine line in FIG. 3) is generated according to the vibration.

Hereinafter, an exemplary embodiment of a manufacturing method of a diffuser sheet according to the invention will be described with reference to FIGS. 5 and 6.

Figure 5:
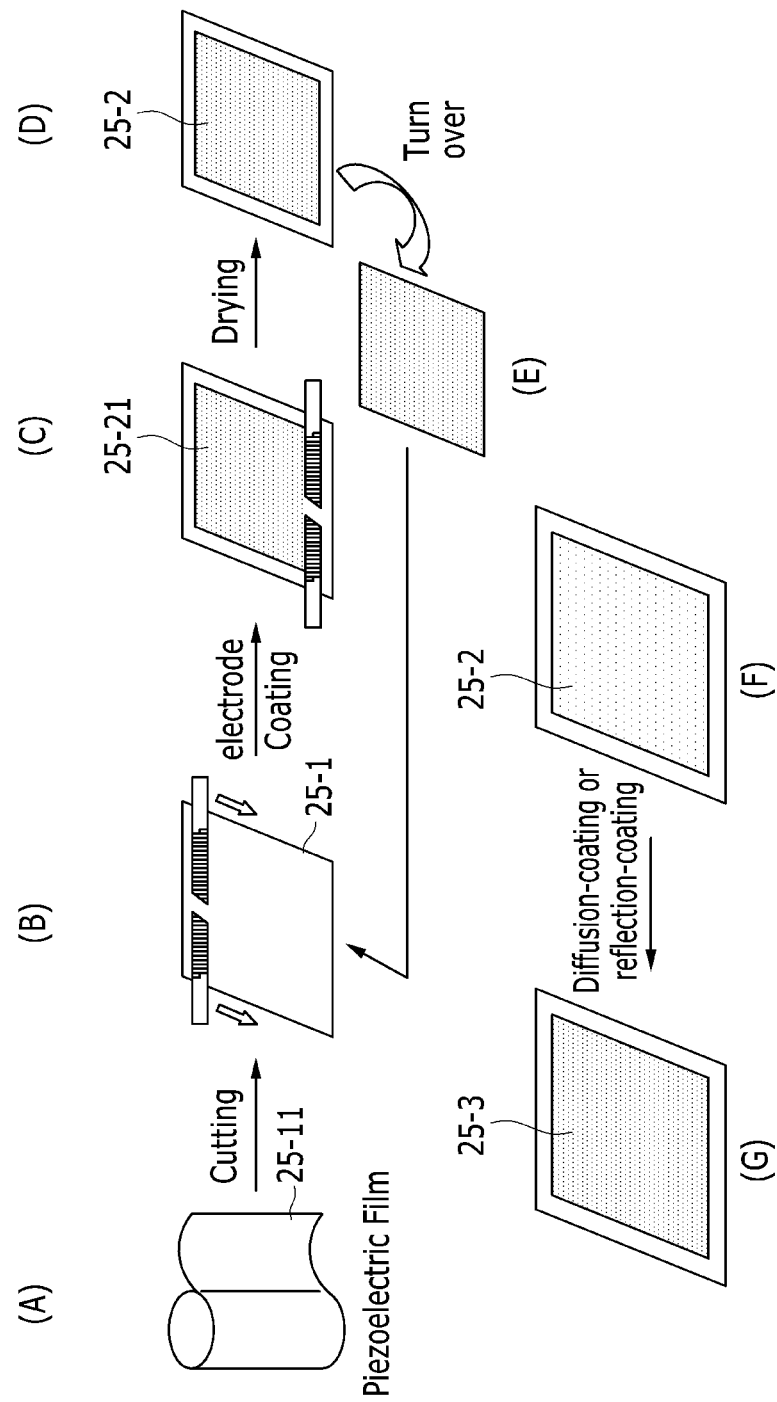
FIGS. 5 and 6 are diagrams illustrating an exemplary embodiment of a manufacturing method of a diffuser sheet according to the invention.
Figure 6:
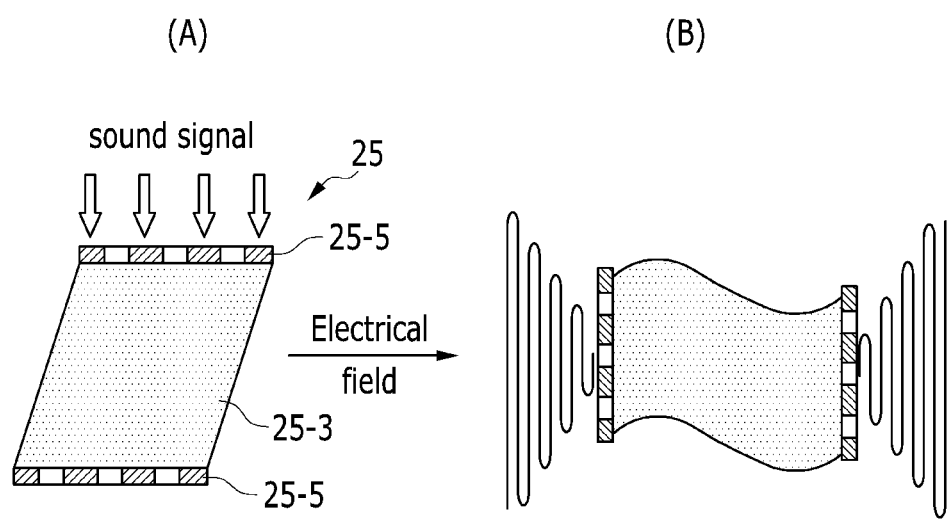

FIGS. 5 and 6 are diagrams illustrating an exemplary embodiment of a manufacturing method of the diffuser sheet according to the invention.

In FIG. 5, a method of forming the vibration material layer 25-1, the pair of electrodes 25-2 and the diffusion layer 25-3 of the diffuser sheet 25 is illustrated.

As illustrated in FIG. 5A, a vibration material (PVDF or PZT; see 25-11 of FIG. 5A) fabricated in a film form is cut to form (e.g., provide) the vibration material layer 25-1.

Next, as illustrated in FIGS. 5B to 5D, conducting polymer such as poly (3,4-ethylenedioxythiophene) ("PEDOT") or CNT is coated ('electrode Coating') on one side of the vibration material layer 25-1 (see 25-21 of FIG. 5C), and thereafter, the layer of coated conducting polymer 25-21 is dried through a drying ('Drying') process to form a first electrode 25-2.

Next, as illustrated in FIG. 5E, the vibration material layer 25-1 including the one electrode 25-2 is turned over, and the non-coated opposite side of the vibration material layer 25-1 is exposed. Thereafter, a second electrode 25-2 is formed on the opposite side through the same processes of FIGS. 5B to 5D. The electrodes 25-2 expose upper and lower surfaces of the vibration material layer 25-1 at one end of both of opposing ends of the diffuser sheet 25.

Next, as illustrated in FIG. 5F, a diffusion material is applied to one of the electrodes 25-2 on the vibration material layer 25-1, such as through diffusion-coating, to form the diffusion layer 25-3 on the one of the electrodes 25-2 (see FIG. 5G). The diffusion layer 25-3 and the electrode 25-2 expose a surface of the vibration material layer 25-1 at an end of the diffuser sheet 25. According to an alternative exemplary embodiment, the diffusion layer 25-3 may be formed on both sides of the vibration material layer 25-1, that is, on each of the two electrodes 25-2. Where the diffusion layer 25-3 is formed on each of the two electrodes 25-2, the diffusion layer 25-3 and the electrode 25-2 expose the upper and the lower surfaces of the vibration material layer 25-1 at the end of the diffuser sheet 25.

FIGS. 5F and 5G illustrates that a reflection-coating other than the diffusion-coating may be performed. However, it will be understood that a reflection material is applied through the 'reflection-coating when manufacturing the reflective sheet 26 of FIG. 7, but is not applied when manufacturing the diffuser sheet 25 of FIG. 2.

In FIG. 6, a method of forming the pad 25-5 of the diffuser sheet 25 up to the diffusion layer 25-3 formed as shown in FIG. 5 is illustrated.

As illustrated in FIG. 6A, the pad 25-5 is not formed in the display area through which the light is transmitted through the diffuser sheet 25, and the pad 25-5 is formed in the non-display area through which light is not transmitted. A pair of pads 25-5 is provided to transfer a sound signal to the pair of electrodes 25-2 of the diffuser sheet 25. The pair of pads 25-5 may be respectively formed on opposite surfaces of the vibration material layer 25-1 at one end of the diffuser sheet 25. The diffuser sheet 25 may include a plurality of pairs of pads 25-5 arranged along an edge of the vibration material layer 25-1 at the one end of the diffuser sheet 25. Alternatively, the pair of pads 25-5 may be formed at opposing ends of the diffuser sheet 25, such that the electrodes 25-2 expose upper and lower surfaces of the vibration material layer 25-1 at both opposing ends of the diffuser sheet 25.

In FIG. 6B, the vibration material layer 25-1 vibrates using the electrical field described in FIG. 4 to generate the sound (indicated by the serpentine line), by applying the sound signal from the sound source to the pair of electrodes 25-2 through the pads 25-5.

In the above exemplary embodiments, in the non-emissive display device using the backlight unit 20, the exemplary embodiment in which the sound is generated by using the diffuser sheet 25 of the backlight unit 20 was described. However, the invention is not limited thereto or thereby.

In FIG. 1, the LCD is mainly described, but the above-described exemplary embodiments may be applied to other non-emissive display devices, and may be applied to various transparent optical sheets of the backlight unit 20 in addition to the diffuser sheet 25.

Further, the vibration material layer 25-1 used in the diffuser sheet 25 is formed in an entirety of the display area of the display device and has the film form. However, according to an alternative exemplary embodiment, the vibration material layer 25-1 may be formed only in only a partial area of the display area.

Hereinafter, an exemplary embodiment in which the vibration material layer is included in the reflective sheet 26 of the backlight unit 20 will be described. Hereinafter, the reflective sheet 26 of the backlight unit 20 will be mainly described, but the reflective sheet 26 in which light is not transmitted unlike the diffuser sheet 25 may be formed by using an opaque material. Further, the reflective sheet 26 may be applied to a self-emission display panel without the backlight unit 20. This will be described with reference to FIGS. 17 to 19.

Hereinafter, the exemplary embodiment of FIGS. 7 to 13 will be described.

FIGS. 7 to 13 are diagrams illustrating exemplary embodiments of a reflective sheet according to the invention.

Figure 7:
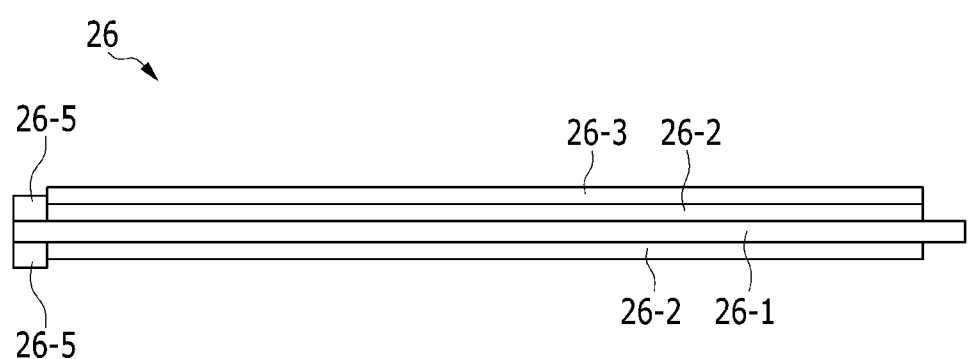
FIGS. 7 to 13 are diagrams illustrating exemplary embodiments of a reflective sheet according to the invention.

First, a vibration material layer 26-1 is disposed on an entirety of the reflective sheet 26 of FIG. 7 like the exemplary embodiment of the diffuser sheet 25 of FIG. 2.

In detail, the exemplary embodiment of the reflective sheet 26 according to the invention includes the vibration material layer 26-1, electrodes 26-2, a reflective layer 26-3 and pads 26-5.

The vibration material layer 26-1 includes a piezo material which vibrates to supply a sound when an electrical field is applied thereto. The piezo material includes PVDF, PZT, $Pb[Zr(x)Ti(1-x)]O_3$, or the like.

The electrodes 26-2 are respectively disposed on opposing sides (e.g., an upper side and a lower side) of the vibration material layer 26-1. The vibration material layer 26-1 may be considered a base layer of reflective sheet 26. The electrodes 26-2 may include an opaque conductor such as a metal, or a conducting polymer and CNT. According to an exemplary embodiment, a transparent conductor may be used. The electrodes 26-2 may be disposed on an entirety of the upper and lower sides of the vibration material layer 26-1.

A pair of pads 26-5 is disposed at edges of the upper and lower sides of the vibration material layer 26-1, and the pair of pads 26-5 is connected with the electrodes 26-2, respectively. The pads 26-5 may include a transparent conductor or an opaque metal. The sound signal applied through the pads 26-5 is applied to the electrode 26-2, and the vibration material layer 26-1 vibrates from the application of the sound signal, and as a result, the sound is generated.

The reflective layer 26-3 is disposed at an outer side of one or more of the pair of electrodes 26-2. The reflective layer 26-3 defines a unique optical characteristic of the reflective sheet 26, that is, the reflective layer 25-3 serves to reflect light so that the light supplied from the light source 12 of the backlight unit 20 is supplied to the display panel.

As such, since the reflective sheet 26 needs to transfer the light supplied from light source 12 upwards towards the display panel, the reflective sheet 26 may not include a transparent material because the light is not transmitted by the reflective sheet 26, but instead needs to be reflected by the reflective sheet 26.

In the illustrated exemplary embodiment of FIG. 7, where the reflective layer 26-3 is positioned on only one side of the reflective sheet 26, the reflective layer 26-3 may be positioned to face the liquid crystal panel assembly 70.

The reflective sheet 26 of the FIG. 7 may be formed through the processes of FIGS. 5 and 6 similar to the forming of the diffuser sheet 25. However, in the forming of the reflective sheet 26, specifically with respect to the process of FIG. 5F, the reflective layer 26-3 is formed through reflection-coating instead of the diffusion-coating.

Figure 12:
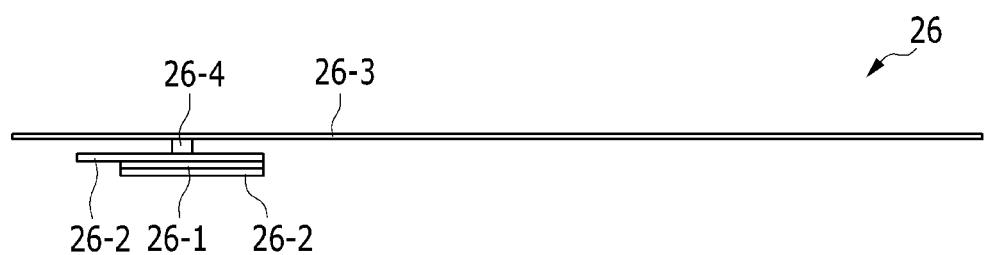
Figure 13:
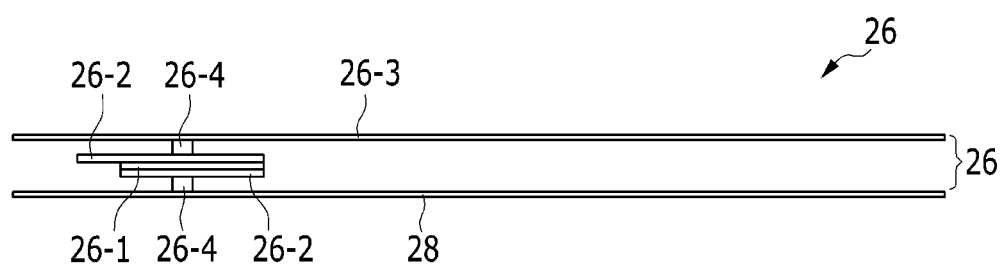

In FIG. 7, the reflective sheet 26 of the backlight unit 20 in a non-emissive display panel is mainly described, but such a vibrating reflective member may be included in the self-emission display panel (for example, an OLED) which does not employ the backlight unit 20. In on exemplary embodiment, for example, a vibration material layer and electrodes may be included in the self-emission display panel in the form of a separate sheet disposed on a rear side of the self-emission display panel. Alternative to the above-described vibrating reflective member as a separate sheet, a vibrating transparent member such as the diffuser sheet 25 of FIG. 2 may be disposed at the front side of the self-emission display panel in the form of a separate sheet. Further alternatively, electrodes and a vibration material layer of a vibrating reflective member may be disposed directly on a rear side of an insulation substrate of the corresponding display panel, such that a separate sheet is not necessary. Where the electrodes and the vibration material layer are disposed directly on an existing element of the corresponding display panel, a spacer 16-4 such ash a tape, an adhesive, a rubber, an insulating material and/or a metal may be included as illustrated in FIG. 12 or 13, so that the vibration material layer 26-1 vibrates.

Hereinabove, the exemplary embodiment in which the vibration material layer 26-1 is disposed on an entirety of the reflective sheet 26 was described.

Hereinafter, an exemplary embodiment in which the vibration material layer 26-1 is disposed only on a portion of the reflective sheet 26 will be described with reference to FIG. 8.

Figure 8:
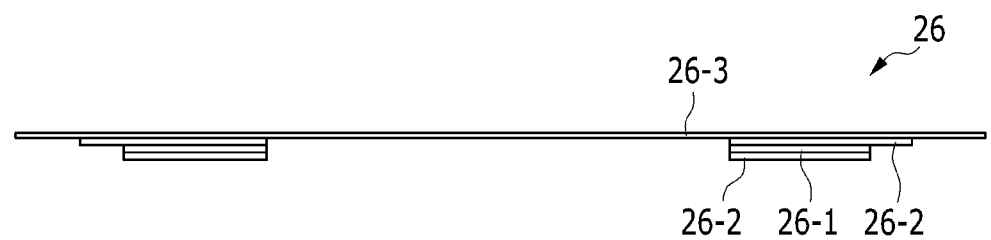

FIG. 8 illustrates an exemplary embodiment in which the vibration material layer 26-1 and the electrodes 26-2 are disposed only on a partial area of a rear surface of the reflective layer 26-3 of the reflective sheet 26. The vibration material layer 26-1 and the electrodes 26-2 are on a same side of a base layer reflective layer 26-3 of the reflective sheet 26.

In the exemplary embodiment of FIG. 8, the reflective layer 26-3 is a film form, and the vibration material layer 26-1 and a pair of electrodes 26-2 are attached to the rear surface thereof to collectively form one sound element. The reflective layer 26-3 may be considered a base layer of the reflective sheet 26.

In one sound element, the pair of electrodes 26-2 are positioned at opposite surfaces of the vibration material layer 26-1. One electrode positioned at the reflective layer 26-3 side of the pair of electrodes 26-2 may be larger and extend further than the vibration material layer 26-1 compared to the other electrode 26-2. The sound element is attached to a rear surface of the reflective layer 26-3 by a fixing element such as an adhesive (not illustrated).

In the exemplary embodiment of FIG. 8, a pair of sound elements are attached to the rear surface of the reflective layer 26-3, respectively at opposing ends of the reflective sheet 26. The pair of sound elements at the opposing ends of the reflective sheet may generate a stereo characteristic by applying different sound signals to each sound element.

Unlike the exemplary embodiment of FIG. 8, the reflective sheet 26 may include only one sound element may include three or more sound elements.

Further, in a plan view, the sound element may have a polygonal structure such as a circle, an oval and a quadrangle.

Figure 9:
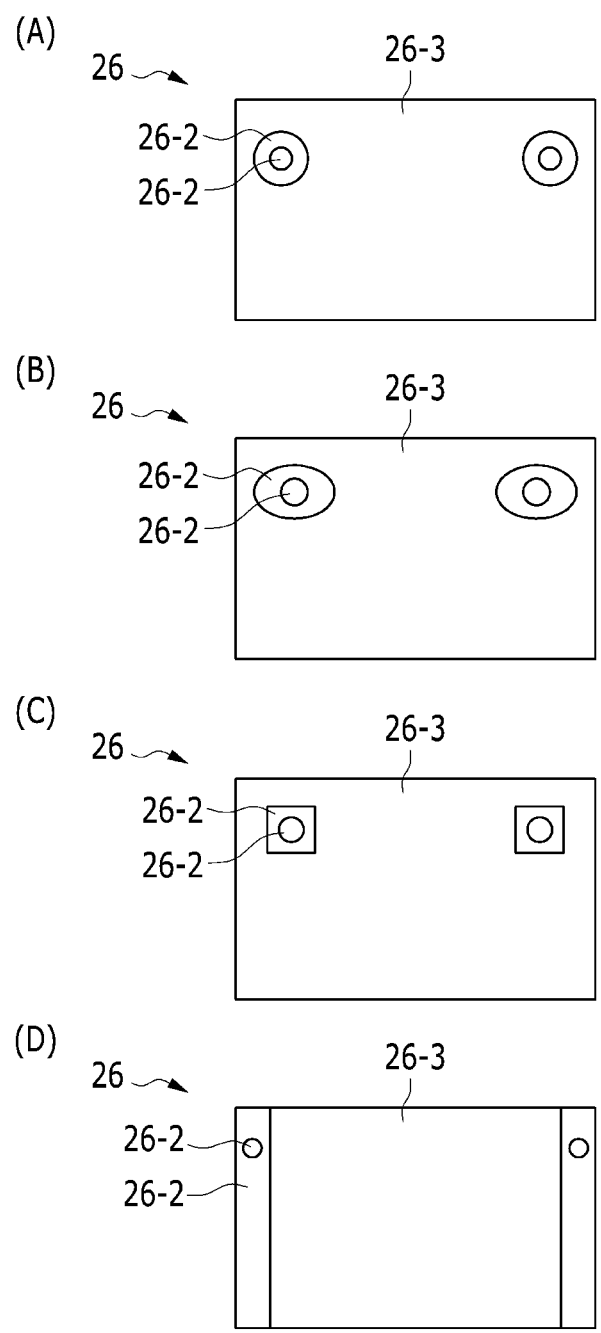

In FIG. 9, various exemplary embodiments of two sound elements disposed on a rear surface of the reflective layer 26-3 are illustrated.

In FIG. 9A, each of a pair of electrodes 26-2 has a circular planar shape, and one electrode 26-2 (hereinafter, referred to as an adhesion electrode) adjacent to the reflective layer 26-3 is relatively large in dimension while the other electrode 26-2 (hereinafter, referred to as an opposed electrode) opposed to the adhesion electrode is relatively small in dimension. The vibration material layer 26-1 may have substantially the same planar size and/or dimension as the opposed electrode.

Two sound elements may be attached to laterally symmetrical positions of the reflective layer 26-3. Further, in FIG. 9A, the sound elements are positioned at the upper left side and the upper right side of the reflective layer 26-3, respectively, but are not limited thereto or thereby. The positions of the sound elements may be various according to other exemplary embodiments.

In an exemplary embodiment of FIG. 9B, the adhesion electrode 26-2 has an oval planar shape, and the vibration material layer 26-1 and the opposed electrode 26-2 each have circular planar shapes.

In an exemplary embodiment of FIG. 9C, the adhesion electrode 26-2 has a quadrangular planar shape, and the vibration material layer 26-1 and the opposed electrode 26-2 each have circular planar shapes.

In an exemplary embodiment of FIG. 9D, the adhesion electrode 26-2 has a substantially linear planar shape which is elongated along left and right short sides of the reflective layer 26-3, and the vibration material layer 26-1 and the opposed electrode 26-2 each have circular planar shapes and are disposed in a partial area of the adhesion electrode 26-2.

The exemplary embodiments shown in FIG. 9 are illustrated as only examples to describe that various exemplary embodiments that may exist, and various exemplary embodiments other than the exemplary embodiments shown in FIG. 9 may be included in the reflective sheet 26.

In the above exemplary embodiments, PVDF and PZT are exemplified as the vibration material layers 25-1 and 26-1, but the invention is not limited thereto or thereby.

The PVDF may include polyvinylidene fluoride trifluoroethylene ("PVDF-TrFE") having a material property to enable PVDF to be easily manufactured in a flexible film form. As a result, the PVDF have a characteristic suitable for forming the vibration material layer on an entirety of the display area as illustrated in FIG. 2 or 7. Further, in the above exemplary embodiments, the display device may be entirely flexible.

In contrast, it is difficult to manufacture the PZT in a film form as compared with the PVDF, such that it is easy to form the PZT only in the partial area of a base layer as illustrated in FIG. 8. Accordingly, in order to form the PZT in a film form when the PZT is used as the vibration material layer, the PZT and the PVDF (or PVDF-TrFE) may be mixed to be used as a material for the respective vibration material layer.

Figure 10:
Figure 11:
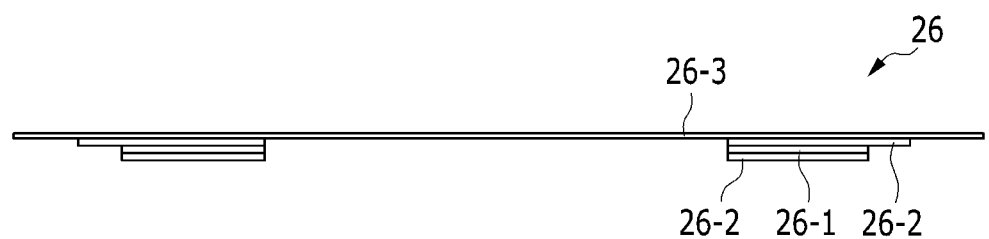

When the vibration material layer obtained by mixing the PZT and the PVDF (or PVDF-TrFE) is used, the vibration material layer 26-1 may be disposed in substantially an entire area of the reflective sheet 26 in a film form as illustrated in FIG. 10, or the vibration material layer 26-1 may be disposed only in the partial area of the reflective sheet 26-1 as illustrated in FIG. 11. In either structure, the vibration material layer 26-1 and the electrodes 26-2 are on a same side of the base layer reflective layer 26-3 of the reflective sheet 26.

In FIGS. 10 and 11, the reflective sheet 26 is mainly described, but the materials may be used in a light-transmitting sheet like the diffuser sheet 25.

The sound element including the vibration material layer and the electrodes vibrates in order to generate a sound, and as illustrated in FIGS. 2, 7 and 8, when a portion of the sound element is directly attached to the base layer of the diffuser sheet 25 and the reflective sheet 26, the diffusion layer 25-3 and the reflective layer 26-3 also vibrate according to the generated sound, which may influence display quality of the display device.

Accordingly, as illustrated in the exemplary embodiment of FIG. 12, when the sound element including the vibration material layer 26-1 is separated by a predetermined distance from the reflective layer 26-3 by the spacer 26-4, a degree of the vibration of the reflective layer 26-3 may be reduced and further, a space of the sound may be secured while securing a vibration space.

The spacer 26-4 may include a tape, an adhesive, a rubber, an insulating material and/or a metal.

In FIG. 12, one sound element is disposed on the rear surface of the reflective sheet 26, but as illustrated in FIGS. 8 and 11, the reflective sheet may include more than one sound element.

Further, FIG. 12 illustrates mainly the reflective sheet 26, but the sound element may also be used in a sheet to have a transmission characteristic like the diffuser sheet 25. Where the sound element is used in the diffuser sheet 25, the sound element may include a transparent material when the sound element is positioned in the non-display area or in the display area.

Further, since the reflective sheet 26 is positioned at the lowest side of the backlight unit 20, the reflective sheet 26 is positioned immediately before the bottom chassis 28. As a result, the spacer 26-4 may be further disposed between the sound element of the reflective sheet 26 and the bottom chassis 28. This is illustrated in FIG. 13.

According to the exemplary embodiment of FIG. 13, the sounding space is defined between the reflective layer 26-3 and the bottom chassis 28. In an exemplary embodiment, an opening may or may not be defined in the bottom chassis 28.

Unlike FIG. 13, according to an exemplary embodiment, the sounding space may be defined by disposing a separate feature inside the bottom chassis 28, instead of the sounding space being defined with the bottom chassis 28.

Figure 14:
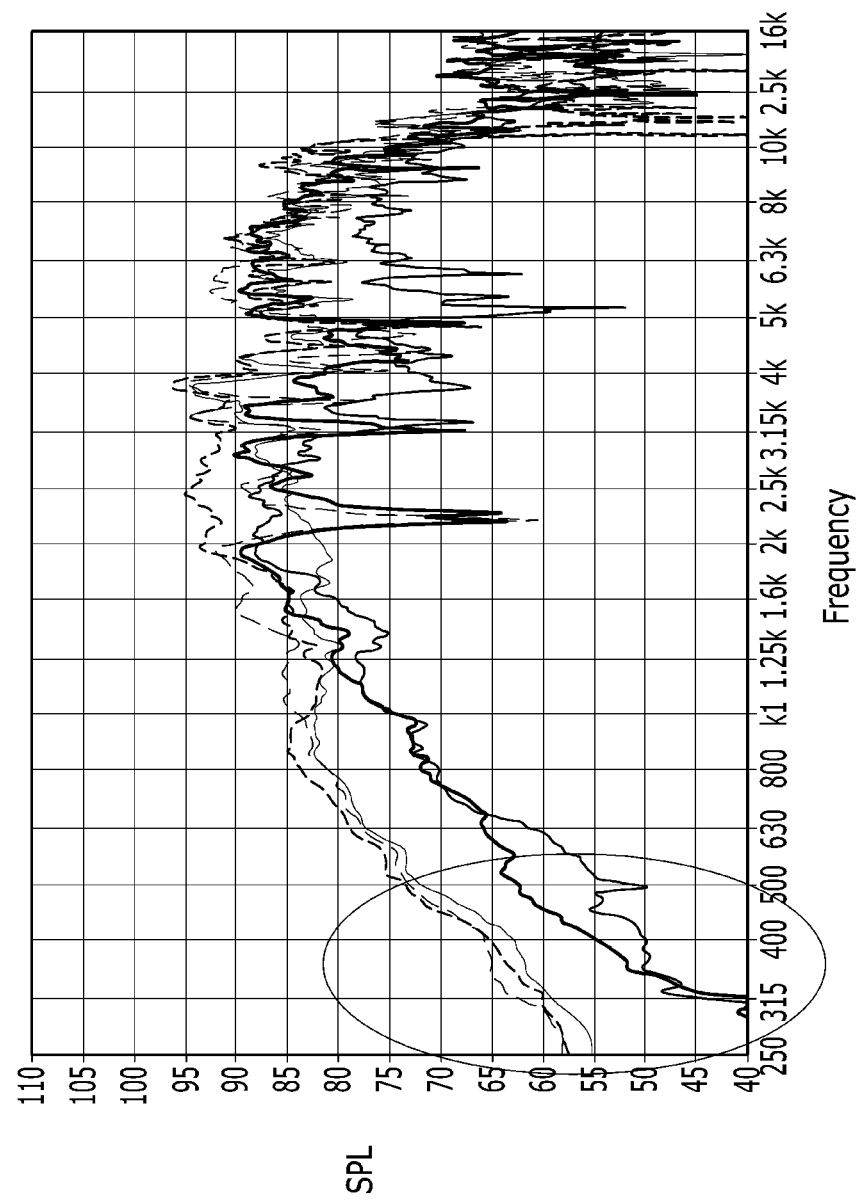
FIG. 14 is a graph illustrating a sound characteristic of an exemplary embodiment of a display device according to the invention.

In the exemplary embodiment in which the reflective sheet 26 includes the sound element, a sound pressure level (SPL) according to a frequency is illustrated in FIG. 14 as a graph.

FIG. 14 is a graph illustrating a sound characteristic of an exemplary embodiment of a display device according to the invention.

As illustrated in FIG. 14, a sound in an audible frequency range and vibration other than the audible frequency (a circle portion of FIG. 14) are generated by vibration provided in the exemplary embodiment of the display device.

Since the vibration is not supplied to a user as an actual sound, the vibration may be considered unnecessary vibration in the display device for generating the sound. However, by using the vibration, a touch may be detected without the display device including an additional or separate touch sensor and/or touch panel.

That is, the vibration is entirely generated by the sound element in the display device, low vibration other than the audible frequency is generated and vibration changed when the user touches the display device is detected, thereby detecting the touch. The detecting of the touch may be a determination of whether the touch has occurred or not, and according to an exemplary embodiment, the detecting may be used together with a haptic function. That is, the vibration material layer may generate vibration of a frequency other than the audible frequency, and the haptic function may be implemented by detecting a change in the frequency to determine the user's touch.

Further, referring to the graph illustrated in FIG. 14, the sound generated in the exemplary embodiment of the sound element of the invention may not supply what is considered a high-quality sound. However, when the sound generated in the exemplary embodiment of the sound element of the invention is considered a relatively low-quality sound is supplied, the sound may be sufficiently supplied to the display device without using a separate speaker. The low-quality sound may include, but is not limited to, music and other sounds otherwise supplied by using a low-priced speaker and content spoken by another person during a mobile phone conversation is heard by the user such as in a receiver role. An exemplary embodiment of the receiver role will be described with reference to FIGS. 15 and 16.

Figure 15:
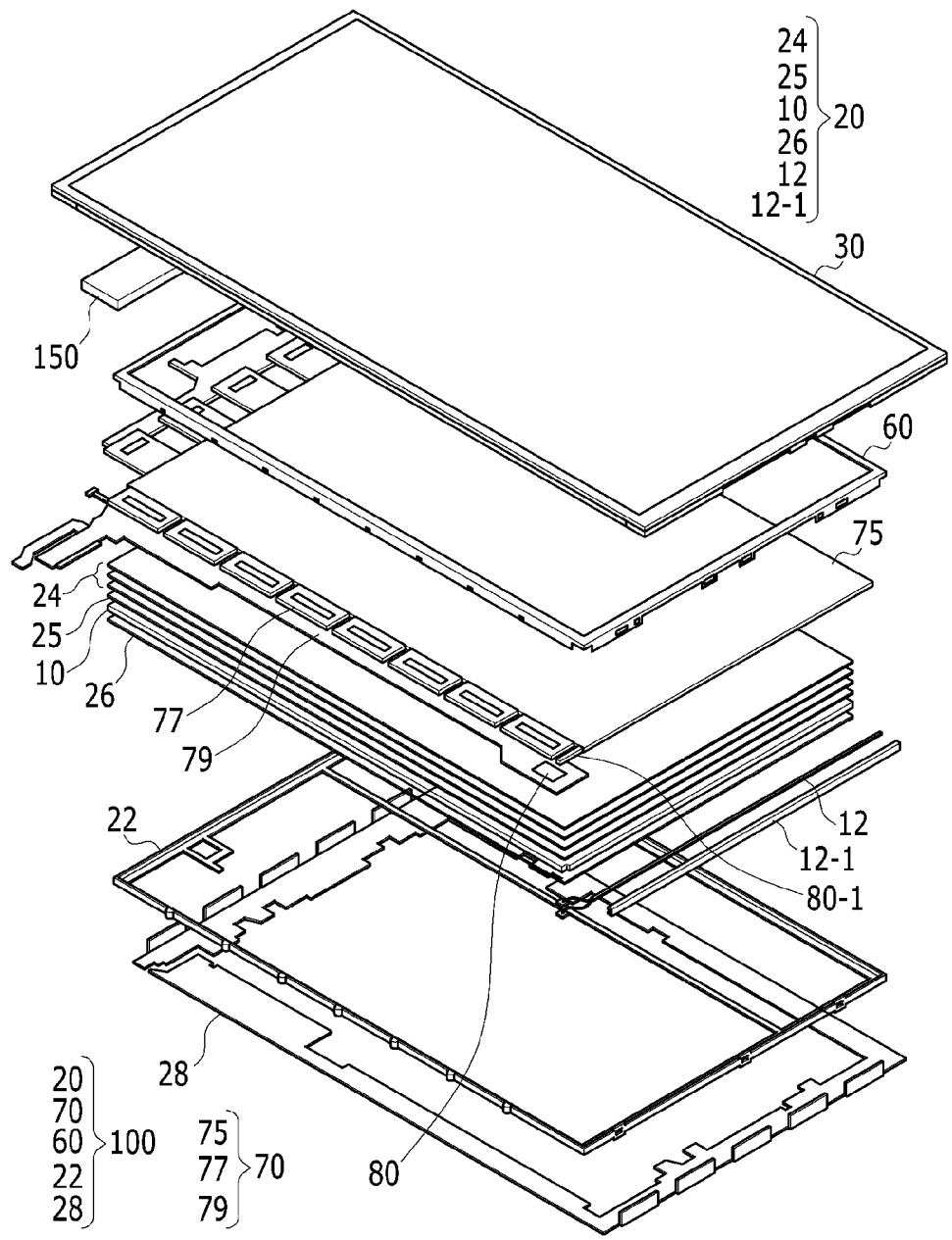
FIG. 15 is an exploded perspective view of another exemplary embodiment of a display device according to the invention.
Figure 16:
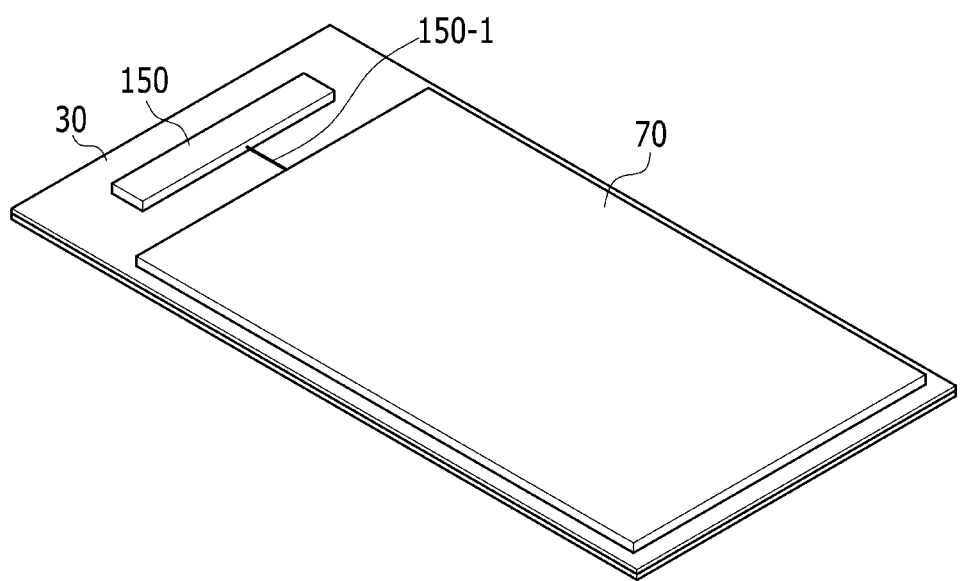
FIG. 16 is a perspective view of an exemplary embodiment of a receiver according to the invention.

FIGS. 15 and 16 are exemplary embodiments including the display device as a receiver according to the invention.

First, in FIG. 15, an exemplary embodiment of the display device further includes a window 30 and a receiver 150 unlike FIG. 1.

The window 30 is positioned on a front side of the display panel assembly 70, such as at a display side of a portable electronic device such as a portable phone or other electronic device. The window 30 may be a frontmost element of the display device and images displayed by the display panel assembly may be viewable through the window 30, the invention not being limited thereto or thereby.

Since the portable phone includes a telephone function, there is a function which transmits a voice and a function which receives the voice. In the exemplary embodiment, the receiver 150 receives the voice. The receiver 150 receiving the voice is disposed at an inner side of the window 30 as illustrated in FIG. 15 and is positioned at the side of the display panel assembly 70. The receiver 150 is attached to an inner surface of the window 30 by a fixing element such as an adhesive and the like.

The receiver 150 includes a sound element including a vibration material layer and a pair of electrodes as in the exemplary embodiment of FIG. 8.

Even in the exemplary embodiment of FIG. 15, the amplifier 80 amplifying and transferring a sound signal is disposed in the FPC board 79. The amplifier 80 receives the sound signal from the outside, amplifies the received sound signal and transfers the amplified sound signal to an electrode in the receiver 150 through the sound signal wire 80-1 to vibrate the vibration material layer in the receiver 150. In one exemplary embodiment, the sound signal wire 80-1 may include a wire disposed on a flexible substrate including the same material as the FPC board 79, or may include a separate electric wire. The amplified sound signal output from the amplifier 80 may be transferred to the receiver 150 through the sound signal wire 80-1 and a receiver wire 150-1 illustrated in FIG. 16. The receiver wire 150-1 is connected to the receiver 150 and the display panel assembly 70.

The window 30 may not include an opening defined at a position to which the receiver 150 is attached. That is, since the receiver 150 generates the sound by vibration generated in the vibration material layer of the sound element, although the opening is not defined in the window 30, the sound may still be transferred to the user. A surface of the window 30 overlaps the receiver 150, such that the window 30 does not expose the receiver 150 or an inner area of the display device. That is, in a portable phone in the related art, since the voice is transferred by using a speaker, the opening is defined in the window 30 and the sound is transferred through the corresponding opening. However, in the exemplary embodiment of the portable phone according to the invention, since the receiver 150 generates the sound by vibration, the opening transferring the sound may not be defined in the window 30. As a result, where the exemplary embodiment of the sound element according to the invention serves as the receiver, although a separate opening is not defined in the window 30, the user may still hear a speaking content of the other person in a conversation based on the vibration.

The window 30 includes tempered glass or plastic, and defining the opening therein may not be easy or cost effective. In one or more exemplary embodiment of the invention, although the processing of defining an opening is easy, the processing nonetheless adds costs, such that a opening is not defined in the window 30.

In the exemplary embodiment of FIG. 1, the vibration material layer is included in at least one of the diffuser sheet 25, the reflective sheet 26 or the optical sheet 24. However, in the exemplary embodiment of FIG. 15, the vibration material layer may not be included in any of the diffuser sheet 25, the reflective sheet 26 or the optical sheet 24 unlike the exemplary embodiment of FIG. 1. In addition, in the exemplary embodiment of FIG. 15, the vibration material layer may be included in at least one of the diffuser sheet 25, the reflective sheet 26 or the optical sheet 24 like the exemplary embodiment of FIG. 1. Where the exemplary embodiment of FIG. 15 includes the vibration material layer is in the diffuser sheet 25, the reflective sheet 26 or the optical sheet 24, the amplifier 80 may transfer the sound signal to the vibration material layer included in at least one of the diffuser sheet 25, the reflective sheet 26 or the optical sheet 24.

FIG. 16 illustrates a perspective view of an inner side of the window 30 after assembling the display panel assembly 70.

That is, the inner side of the window 30 of FIG. 16 is illustrated, and lower sides of the receiver 150 and the display panel assembly 70 which are attached to the inner side of the window are illustrated.

The receiver 150 and the display panel assembly 70 are connected with each other by the receiver wire 150-1, and the receiver wire 150-1 may receive the sound signal from the amplifier 80 in the display panel assembly 70.

In an alternative exemplary embodiment, the sound signal applied to the receiver 150 may not be received from the display panel assembly 70, but may be received from a separate input terminal.

As such, various exemplary embodiments may be applied even to a self-emission display device not including the backlight unit 20. The self-emission display devices include various exemplary embodiments, but hereinafter, an OLED which is representative among the self-emission display devices will be mainly described.

Figure 17:
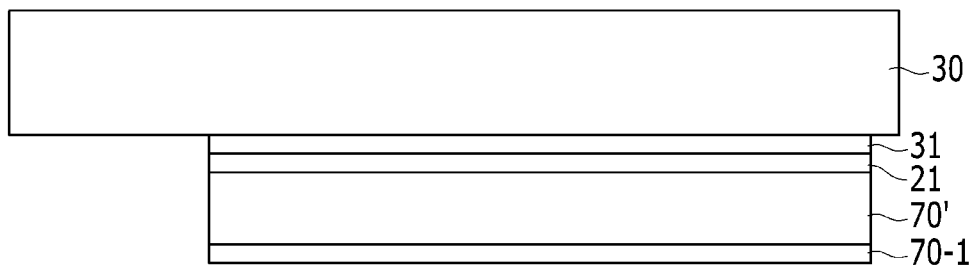
FIG. 17 is a cross-sectional view of an exemplary embodiment of an organic light emitting diode display device according to the invention.
Figure 18:
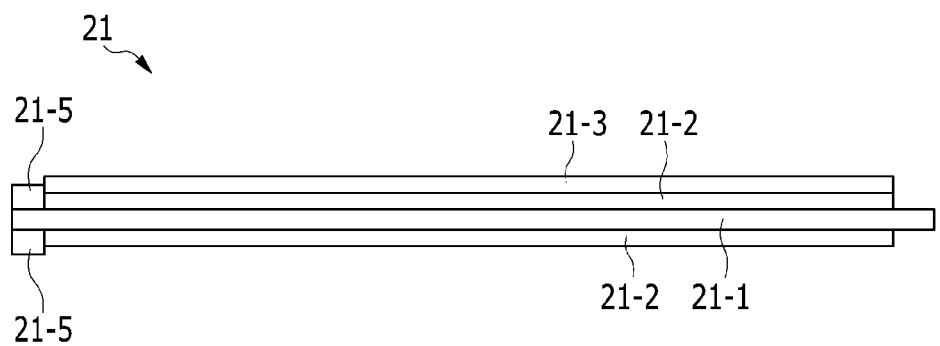
FIG. 18 is a cross-sectional view of an exemplary embodiment of a polarization sheet according to the invention.
Figure 19:
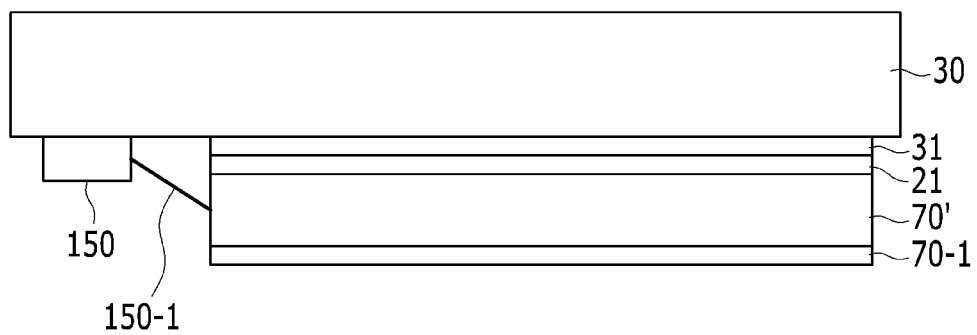
FIG. 19 is a cross-sectional view of another exemplary embodiment of an organic light emitting diode display device according to the invention

FIGS. 17 to 19 are exemplary embodiments of an OLED display as the display device according to the invention.

In FIG. 17, a cross-sectional view of an OLED display including the window 30 is illustrated.

An organic light emitting panel 70' includes a LED which self-emits light and thus a separate backlight unit 20 is unnecessary.

A polarization sheet 21 is disposed on a front side of the organic light emitting panel 70'.

An exemplary embodiment of the polarization sheet 21 according to the invention has a structure illustrated in FIG. 18.

Referring to FIG. 18, the exemplary embodiment of the polarization sheet 21 according to the invention includes a vibration material layer 21-1, electrodes 21-2, a polarization layer 21-3 and pads 21-5.

The vibration material layer 21-1 includes a piezo material which vibrates to supply a sound when an electrical field is applied thereto, and the piezo material includes PVDF, PZT ceramics, or the like.

The electrodes 21-2 are respectively disposed on opposing sides (e.g., an upper side and a lower side) of the vibration material layer 21-1. The electrodes 21-2 may include a transparent conductor such as ITO and IZO, or a conducting polymer and CNT. The electrodes 21-2 may have a film form, and may be disposed on an entirety of the upper and lower sides of an area of the vibration material layer 21-1 (hereinafter, referred to as a display area) through which light passes through and an image is displayed.

A pair of pads 21-5 are disposed in an area of the upper and lower sides of the vibration material layer 21-1(hereinafter, referred to as a non-display area) through which light does not pass. The pair of pads 21-5 are connected with the electrodes 21-2, respectively. The pads 21-5 may include a transparent conductor or an opaque metal. The sound signal amplified by the amplifier 80 is transmitted through the pads 21-5 and applied to the electrodes 21-2 through the sound signal wire 80-1. The vibration material layer 21-1 vibrates by the sound signal, and as a result, the sound is generated by the polarization sheet 21.

The polarization layer 21-3 is disposed at an outer side of one or more of the pair of electrodes 21-2. The polarization layer 21-3 defines a unique optical characteristic of the polarization sheet 21, that is, the polarization layer 21 serves to transmit only light having a predetermined polarization direction. According to an alternative exemplary embodiment, a pair of polarization layers 21-3 may be respectively disposed on outer surfaces of the pair of electrodes 21-2.

According to an exemplary embodiment, another optical sheet rather than the polarization sheet 21 may be positioned on the front side of the organic light emitting panel 70', and a vibration material layer may be included in the corresponding optical sheet.

The polarization sheet 21 illustrated in FIG. 18 may be applied to non-emissive display devices such as a liquid crystal display as well as self-emission display devices such as including the organic light emitting panel 70'. That is, polarization sheets may be attached to upper and lower outer sides of the liquid crystal panel, and a vibration material layer may be included in one of the corresponding polarization sheets.

Referring back to FIG. 17, the window 30 is positioned on a front side of the polarization sheet 21. The window 30 and the polarization sheet 21 may be attached to each other by an adhesive layer 31.

A cushion layer 70-1 may be positioned on a rear side of the organic light emitting panel 70'. Where the organic light emitting diode display is included in an electronic device (including a portable electronic device), the cushion layer 70-1 serves to prevent the OLED display from directly contacting a main body of the electronic device to decrease impact to the OLED display.

According to alternative exemplary embodiments, the cushion layer 70-1 and/or the adhesive layer 31 may be omitted, and/or another optical sheet rather than the polarization sheet 21 may be positioned.

Further, in another exemplary embodiment, the vibration material layer is not included in the polarization sheet 21. Instead, an additional sheet is further included on the rear side of the organic light emitting panel 70', and a vibration material layer and electrodes may be included in the sheet.

FIG. 19 illustrates another exemplary embodiment of a OLED display which includes a receiver, unlike the exemplary embodiment of FIG. 17.

The receiver 150 includes a sound element including a vibration material layer and a pair of electrodes like the exemplary embodiment of FIG. 8. The receiver 150 receives a sound signal from the amplifier 80 through the receiver wire 150-1, and the amplifier 80 may be positioned on a circuit board disposed in the organic light emitting panel 70'.

Further, the window 30 may not include an opening defined at a position to which the receiver 150 is attached.

The exemplary embodiment of FIG. 19 does not include the backlight unit 20 unlike the exemplary embodiments of FIGS. 1 and 15. As a result, the vibration material layer may not be included in at least one of the diffuser sheet, the reflective sheet, or the optical sheet of the backlight unit. Instead, the vibration material layer may be included in a polarization sheet 21 positioned on the front side of the organic light emitting panel 70'. According to an alternative exemplary embodiment, the vibration material layer may not be included in the polarization sheet 21.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a display panel assembly; and
a backlight unit comprising an optical sheet, a reflective sheet and a light source,
wherein at least one of the optical sheet and the reflective sheet comprises:
a vibration material layer including material which supplies a sound by receiving an electrical field, and
a sound element comprising a pair of electrodes respectively disposed on upper and lower sides of the vibration material layer in an entirety of a display area on which an image is displayed.

2. The display device of claim 1, wherein:
the material which supplies the sound by receiving the electrical field comprises lead zirconium titanate, polyvinylidene fluoride, polyvinylidene fluoride trifluoroethylene, or a combination thereof.

3. The display device of claim 1, wherein:
the optical sheet comprises the material which supplies the sound by receiving the electrical field, and
the optical sheet further comprises a diffusion layer on an outer surface of an electrode of the pair of electrodes.

4. The display device of claim 1, wherein:
the reflective sheet comprises the material which supplies the sound by receiving the electrical field, and further comprises a reflective layer on an outer surface of an electrode of the pair of electrodes.

5. The display device of claim 1, wherein:
the vibration material layer is a film.

6. The display device of claim 1, wherein:
the vibration material layer is in only a partial area of the one of the optical sheet and the reflective sheet.

7. The display device of claim 6, wherein the one of the optical sheet and the reflective sheet further comprises a pair of sound elements.

8. The display device of claim 1, further comprising a spacer between the sound element and a component of the display device,
wherein a space in which the sound element vibrates is defined between the sound element and the component of the display device.

9. The display device of claim 1, further comprising:
a top chassis, a mold frame and a bottom chassis which fix the display panel assembly and the backlight unit in the display device.

10. The display device of claim 1, wherein:
the vibration material layer generates vibration of frequencies outside an audible frequency, and
a haptic function of the display device uses a change in the frequencies outside the audible frequency to detect a touch.

11. The display device of claim 1, further comprising:
a window on a display side of the display panel assembly.

12. The display device of claim 11, further comprising:
a receiver on an inner side of the window and configured to transfer a voice.

13. The display device of claim 12, wherein:
the receiver comprises:
a vibration material layer comprising the material which supplies the sound by receiving the electrical field; and
a pair of electrodes.

14. The display device of claim 13, wherein:
the vibration material layer comprises lead zirconium titanate, polyvinylidene fluoride, polyvinylidene fluoride trifluoroethylene, or a combination thereof.

15. The display device of claim 12, wherein:
the window overlaps the receiver.

16. A display device, comprising:
a display panel assembly; and
a polarization sheet on a display side of the display panel assembly,
wherein the polarization sheet comprises:
a vibration material layer which is disposed on the display side and comprises a material which supplies a sound by receiving an electrical field; and
a sound element which is disposed on the display side and comprises a pair of electrodes respectively on upper and lower sides of the vibration material layer.

17. The display device of claim 16, wherein:
the display panel assembly is an organic light emitting panel.

18. The display device of claim 16, further comprising:
a window positioned on display sides of the display panel assembly and the polarization sheet.

19. The display device of claim 18, further comprising:
a receiver on an inner side of the window and configured to transfer a voice.

20. The display device of claim 19, wherein:
the receiver comprises the vibration material layer and the pair of electrodes.

21. The display device of claim 20, wherein:
the vibration material layer comprises lead zirconium titanate, polyvinylidene fluoride, polyvinylidene fluoride trifluoroethylene, or a combination thereof.

22. The display device of claim 19, wherein:
the window overlaps the receiver.

23. The display device of claim 18, further comprising:
an adhesive layer between the polarization sheet and the window.

24. The display device of claim 18, further comprising:
a cushion layer on a rear side of the display panel assembly.

* * * * *